(No Model.)
W. H. ELMER.
HUB.
No. 387,557. Patented Aug. 7, 1888.
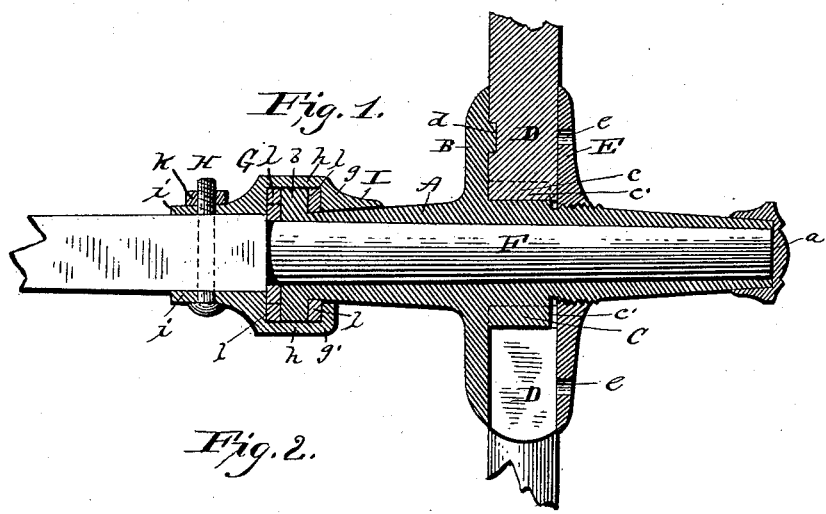
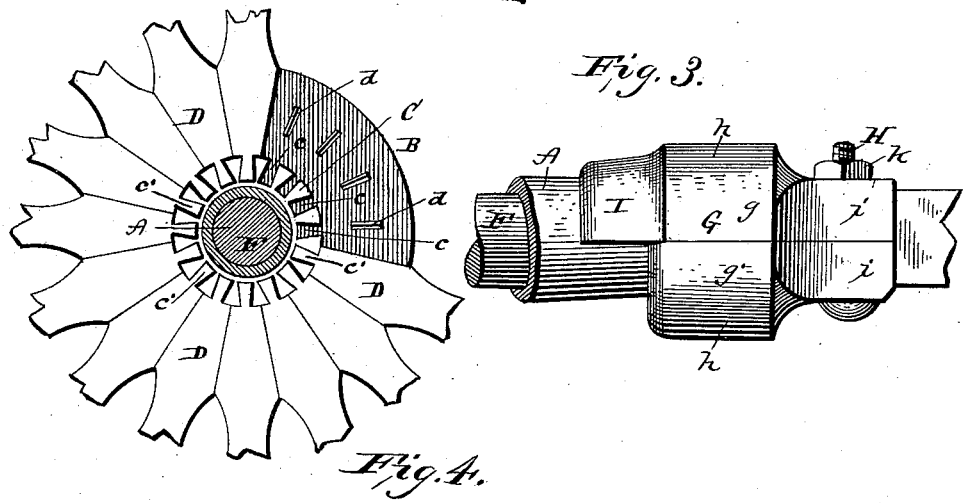
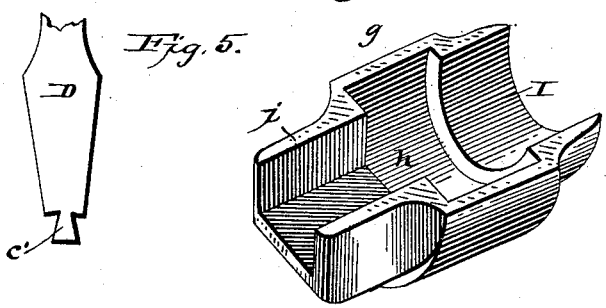
WITNESSES:
Jno. S. French Jr.
Chas. D. Davis.
INVENTOR:
Wm. H. Elmer,
By C. M. Alexander,
Attorney.

UNITED STATES PATENT OFFICE.

WILLIAM H. ELMER, OF BERLIN, WISCONSIN.

HUB.

SPECIFICATION forming part of Letters Patent No. 387,557, dated August 7, 1888.

Application filed April 5, 1888. Serial No. 269,710. (No model.)

*To all whom it may concern:*

Be it known that I, WILLIAM H. ELMER, a citizen of the United States, residing at Berlin, in the county of Green Lake and State of Wisconsin, have invented certain new and useful Improvements in Hubs, of which the following is a specification, reference being had therein to the accompanying drawings.

My invention has relation to certain new and useful improvements upon that class of cast-metal hubs wherein the tenons of the spokes are firmly clamped between a stationary flange formed integral with the hollow shank of the hub and an adjustable flange working upon a screw-threaded portion of the said hollow shank, as will more fully hereinafter appear.

The invention has for its objects, essentially, to improve and simplify the construction of this class of metallic hubs, whereby the spokes will be more firmly and securely held against radial and lateral displacement or movement should the tire of the wheel become worn and loose; also, to provide improved and novel means for removably attaching the axle to the inner end of the hollow shank of the hub, as will be fully hereinafter set forth.

To these ends the invention consists in certain novel features of construction that will be fully hereinafter set forth, and particularly pointed out in the claims appended.

Referring to the accompanying drawings, which form a part of this specification, Figure 1 represents a longitudinal sectional elevation of my improved hub; Fig. 2, a transverse sectional view of the same, the adjustable clamping-flange being removed to show the disposition of the spokes; Fig. 3, a detail side elevation of the two-part clip employed for attaching the axle to the hub; Fig. 4, a detail perspective view of the upper half or part of this clip, and Fig. 5 a detail view of a spoke-tenon as used in my improved hub.

Referring to the drawings by letter, A designates the hollow metallic shank or cylinder, closed at its outer end by means of a suitable cap, $a$, and provided on its inner end with an annular collar or flange, $b$, which stands at right angles to the said shank. Formed integral with this hollow shank, a little to one side of the middle of its length, is a permanent annular abutting flange or disk, B, which is formed at right angles to the longitudinal plane of the hollow shank, the bearing-face of this flange being directed outwardly.

Formed integral with the shank A and the flange B on the bearing or outer side of this flange is a collar or ring, C, this ring being located in the angle formed by the said flange and shank. The ring C extends along the hub-shank a short distance, its width being nearly equal to that of the spoke-tenons D, as shown in Fig. 1. This ring, as will be observed from Figs. 1 and 2, is provided entirely around its circumference with radial dovetail slots or spaces $c$, which extend from the bearing-face of the flange B to the outer edge of the ring. In a direct radial line with each one of these slots $c$ on the bearing-face of the flange B is formed a lug or projection, $d$, which enters the tenons of the spokes when the same are pressed or forced into place, and serves to prevent the hub twisting or turning independently of the spokes. The spoke-tenons are all formed tapering, so as to fit compactly between the permanent abutting disk B and the adjustable clamping-disk E, and at their extreme inner ends are provided with small dovetail tenons $c'$, which are pressed firmly and snugly into the radial dovetail slots $c$ of the ring C. By thus dovetailing the inner ends of the spokes into the hub it will be impossible for them to be withdrawn radially or become displaced when the tire of the wheel becomes loose. When the adjustable flange E (which works upon a screw-threaded portion of the shank and is provided with holes $e$ for the insertion of a tool or wrench to turn it) is screwed firmly up against the spoke-tenons, they will be all firmly secured in place and will be enabled to withstand strain in all directions.

By making the ring C of less width than the spoke-tenons it is evident that it will be prevented from interfering with the adjustable disk E when the same is screwed up close against the spoke-tenons. It also allows the disk E to be tightened should any of the spokes become a little loose from wear. The advantage arising from this will be evident, as the spokes may be always kept perfectly tight and firm.

The spindle F of the axle is held in the hollow shank of the hub by means of the two-part coupling or clip G, which will now be described. The clip consists, essentially, of an upper and lower part or half, g g', each of which consists of a semi-cylindrical casing, h, these two casings having formed on their inner ends flanges or sockets i i, which closely embrace the axle when the clip is attached thereto. The clip is attached to the axle by means of the vertical bolt H, which passes through the sockets i i and the axle, a nut, k, being tapped upon this bolt to bind the parts together. When the clip is thus attached to the axle, the two semi-cylindrical casings h h form a complete cylinder, in which the collar b on the inner end of the shank A fits snugly, and is adapted to revolve, washers or packing-rings l l being interposed between this collar b and the end walls of the cylinder thus formed.

Formed integral with the upper portion of the clip and extending outwardly therefrom is a semi-cylindrical extension, I, which forms a "sand-band" to keep out sand and grit from the axle and contacting parts of the clip. This sand-band extension I is rounded off on top, so as to readily shed any dirt or other foreign substance that may be deposited thereon.

Having thus fully described my invention, what I claim as new, and desire to secure by Letters Patent, is—

1. In a vehicle-hub, the combination, with the hollow shank A, having formed on a portion of its outer surface screw-threads, the stationary abutting disk B, formed integral with the said shank A and standing at right angles to the same, this disk B being provided upon its outer or bearing face with projections which enter the tenons of the spokes, the ring C, formed integral with the said shank and disk in the angle formed by the same, this ring being provided with longitudinal radial dovetail slots c, and the spokes provided with tapering or wedge-shaped tenons, each one of these tenons being provided on its extreme inner end with a smaller dovetail tenon, c', which enter the dovetail slots c in the ring C, and the adjustable clamping-disk E, adapted to firmly clamp and hold the spokes in their proper place, as and for the purpose herein set forth.

2. The combination, with the hollow shank having formed integral with it the abutting disk B, the ring C, formed integral with the said shank and disk in the angle formed by them, the disk being of less width than the spoke-tenons and provided with radial dovetail slots c, and the spokes provided with dovetail tenons c', which are adapted to enter the said slots c and serve to retain the spokes in the hub, of the clamping-disk, substantially as described.

3. The combination of the hub provided on its inner end with a collar, b, and the axle provided with a spindle adapted to enter the said hub, of the clip G, consisting of the two parts g g', clamped to the axle by means of the bolt H, these two parts forming when thus attached to the axle a complete cylinder, which embraces the said collar b upon the hub and permits the same to rotate freely, the interposed washers, and the sand-band extension I, formed upon the upper part of the clip and embracing the upper portion of the shank of the hub, the said bolt extending through the parts of the clip and axle, substantially as described.

In testimony whereof I affix my signature in presence of two witnesses.

WILLIAM H. ELMER.

Witnesses:
A. L. TUCKER,
P. F. WHITING.